(12) United States Patent
Pierres et al.

(10) Patent No.: US 9,789,748 B2
(45) Date of Patent: Oct. 17, 2017

(54) HEATING, VENTILATION AND/OR AIR-CONDITIONING UNIT CASING FOR MOTOR VEHICLE PASSENGER COMPARTMENT

(71) Applicant: Valeo Systemes Thermiques, Le Mesnil Saint Denis (FR)

(72) Inventors: Philippe Pierres, Elancourt (FR); Jan Liska, Rakovnik (CZ)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 658 days.

(21) Appl. No.: 14/367,067

(22) PCT Filed: Dec. 17, 2012

(86) PCT No.: PCT/EP2012/075721
§ 371 (c)(1),
(2) Date: Jun. 20, 2014

(87) PCT Pub. No.: WO2013/092465
PCT Pub. Date: Jun. 27, 2013

(65) Prior Publication Data
US 2014/0349567 A1    Nov. 27, 2014

(30) Foreign Application Priority Data
Dec. 23, 2011 (FR) .................... 11 04051

(51) Int. Cl.
*F24F 7/06* (2006.01)
*B60H 1/24* (2006.01)
*B60H 1/00* (2006.01)

(52) U.S. Cl.
CPC .......... *B60H 1/24* (2013.01); *B60H 1/00028* (2013.01); *B60H 1/00542* (2013.01)

(58) Field of Classification Search
CPC .. B60H 1/24; B60H 1/00028; B60H 1/00542; B60H 1/00514; B60H 1/00521
See application file for complete search history.

(56) References Cited

U.S. PATENT DOCUMENTS 4,533,081 A * 8/1985 Forsting ............. B60H 1/00028
165/78
4,672,819 A * 6/1987 Mino .................. B60H 1/00371
165/76

(Continued)

FOREIGN PATENT DOCUMENTS

DE    10350193 A1    5/2004
EP     1142734 A2   10/2001
EP     1241032 A2    9/2002

OTHER PUBLICATIONS

English language abstract and machine-assisted English translation for DE10350193 extracted from espacenet.com database on Aug. 7, 2014, 17 pages.

(Continued)

*Primary Examiner* — Steven B McAllister
*Assistant Examiner* — Jonathan Cotov
(74) *Attorney, Agent, or Firm* — Howard & Howard Attorneys PLLC

(57) ABSTRACT

The invention relates to a motor vehicle passenger compartment heating, ventilation and/or air conditioning unit casing comprising at least: —an induction chamber (2) the peripheral wall of which forms a volute housing (12) and which is intended to accommodate an impeller of a motor-fan unit, —a distribution chamber (4) connected to an outlet (3) of the induction chamber (2), —distribution channels (5) connected to an outlet of the distribution chamber (4). According to the invention, the casing comprises an internal partition element (15) of which one face forms at least part of the volute housing (12) and of which the opposite face to the (Continued)

volute housing forms one wall of at least one distribution channel (5).

14 Claims, 3 Drawing Sheets

(56) References Cited

U.S. PATENT DOCUMENTS

| | | | | | |
|---|---|---|---|---|---|
| 6,261,172 | B1* | 7/2001 | Shibata | ............... | B60H 1/00028 454/121 |
| 6,431,257 | B1* | 8/2002 | Sano | ................. | B60H 1/00064 165/202 |
| 6,886,630 | B2* | 5/2005 | Onda | ................. | B60H 1/00028 165/202 |
| 6,920,921 | B2* | 7/2005 | Nagata | ............... | B60H 1/00028 165/137 |
| 6,991,027 | B2* | 1/2006 | Ozeki | ................. | B60H 1/0005 165/203 |
| 7,048,036 | B2* | 5/2006 | Han | ................... | B60H 1/00028 165/202 |
| 7,845,391 | B2* | 12/2010 | Kawahara | .......... | B60H 1/00514 165/134.1 |
| 8,079,405 | B2* | 12/2011 | Shindoh | ............. | B60H 1/00028 165/202 |
| 8,887,797 | B2* | 11/2014 | Kim | ................... | B60H 1/00028 165/202 |
| 2002/0129931 | A1* | 9/2002 | Nagata | ............... | B60H 1/00028 165/202 |
| 2003/0192334 | A1* | 10/2003 | Kawauchi | .......... | B60H 1/00028 62/244 |
| 2004/0093885 | A1* | 5/2004 | Ito | ...................... | B60H 1/00028 62/244 |
| 2007/0210616 | A1* | 9/2007 | Wenzel | ................. | B29C 45/006 296/187.03 |
| 2008/0051023 | A1* | 2/2008 | Fischle | ............. | B60H 1/00542 454/156 |
| 2013/0160971 | A1* | 6/2013 | Makita | ............... | B60H 1/00021 165/59 |

OTHER PUBLICATIONS

International Search Report for PCT/EP2012/075721 dated Mar. 25, 2013, 5 pages.

\* cited by examiner

HEATING, VENTILATION AND/OR AIR-CONDITIONING UNIT CASING FOR MOTOR VEHICLE PASSENGER COMPARTMENT

RELATED APPLICATIONS

This application is the National Stage of International Patent Application No. PCT/EP2012/075721, filed on Dec. 17, 2012, which claims priority to and all the advantages of French Patent Application No. 11/04051, filed on Dec. 23, 2011, the content of which is incorporated herein by reference.

The present invention relates to the field of ventilation and/or air-conditioning of the passenger compartment of a vehicle. The invention relates more particularly to a housing of a ventilation, heating and/or air-conditioning unit used to channel air while it is being conditioned, before it is injected into the passenger compartment and, where applicable, when it is recycled.

In this field, it is known to use a system comprising an impeller that sucks in air in order to blow it into a ventilation, heating and/or air-conditioning unit from which the conditioned air is directed towards the interior of the passenger compartment. The ventilation, heating and/or air-conditioning unit generally comprises a housing delimiting at least one suction chamber, the peripheral wall of which forms a volute and which is intended to receive an impeller of a motor-fan unit. The housing also delimits a distribution chamber connected to an outlet of the suction chamber and also distribution channels connected to an outlet of the distribution chamber.

The housing is most often formed by two casings of a plastics material, the different zones of which are completely separate and do not fit into one another, so that it is possible to remove these casings from the mould.

However, such an embodiment, that actually allows a housing to be produced at a low cost, has the disadvantage of being relatively voluminous.

Moreover, the design of new motor vehicles requires that the space usually available for the ventilation unit is reduced, so that the need has become apparent for a new type of housing, the design of which enables its volume to be reduced while retaining all the functions of housings of the prior art and having dimensions that do not result in an excessive loss of pressure.

In order to achieve this objective, the invention relates to a housing of a ventilation, heating and/or air-conditioning unit for a motor vehicle passenger compartment delimiting at least:
  a suction chamber of which the peripheral wall forms a volute and which is intended to receive an impeller of a motor-fan unit;
  a distribution chamber connected to an outlet of the suction chamber;
  distribution channels connected to an outlet of the distribution chamber.

According to the present invention, the housing comprises an internal partition element of which a face forms at least a portion of the volute and of which the face opposite the volute forms a wall of at least one distribution channel. The use of a partition element that delimits both the volute and a distribution channel makes it possible to prevent space from being wasted and thus to obtain a housing that is as compact as possible at equivalent levels of ventilation performance.

According to an embodiment of the invention, the housing comprises two casings that together form an outer envelope of the housing and which, with the internal partition element added inside the two housings, delimit at least a portion of the volute of the suction chamber and at least a portion of the distribution channels.

Such an embodiment of the housing makes it possible to obtain casings with shapes that are easily removed from the moulds, and to simplify the manufacture of the moulds, and to do so by adding an additional partition element that enables a structure to be obtained that could not have been obtained directly by moulding the casings in the conventional manner.

According to a feature of the invention, the internal partition element bears, on its face opposite the volute, at least one dividing wall separating two distribution channels.

According to a variant of this feature, the internal partition element comprises at least three dividing walls separating at least two distribution channels.

According to another variant of this feature, each dividing wall extends substantially perpendicular to the face of the partition element that bears it.

According to a feature of the invention, the housing comprises at least one mixing chamber or mixing channel.

According to another feature of the present invention, the internal partition element comprises at least two dividing walls separating supply channels of the mixing chamber.

According to another feature of the invention, the housing comprises at least one mixing chamber or mixing channel and at least a second added internal partition element which comprises at least two dividing walls separating supply channels of the mixing chamber.

According to yet another feature of the invention, the internal partition element comprises at least one support bearing of a valve controlling at least one distribution channel.

According to a variant of this feature, each support bearing is arranged in a dividing wall.

The invention also relates to a ventilation, heating and/or air-conditioning unit for a motor vehicle passenger compartment, comprising a housing according to the invention and a motor-fan unit of which an impeller is situated in the suction chamber of the housing.

Of course, the different variants and embodiments of the invention can be associated with one another in various combinations inasmuch as they are not incompatible with or exclusive of one another.

Furthermore, various other features of the invention become apparent from the appended description, made with reference to the drawings which illustrate a non-limiting embodiment of a ventilation unit housing according to the invention.

Figure 1:
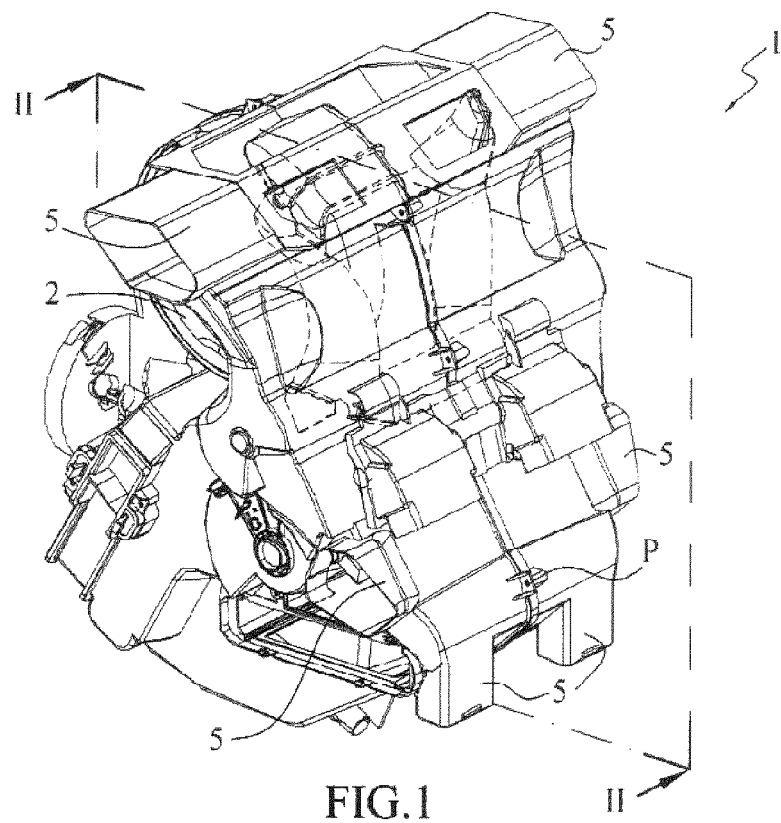
FIG. 1 is a diagrammatic perspective view of a housing, according to the invention, of a ventilation, heating and/or air-conditioning unit for a motor vehicle passenger compartment.

A housing of a ventilation, heating and/or air-conditioning unit for a motor vehicle passenger compartment according to the invention, as referenced in its entirety by the reference numeral 1 in FIG. 1, is intended to be placed between the engine compartment and the passenger compartment of the vehicle, usually beneath the dashboard or the front windscreen shelf.

Figure 2:
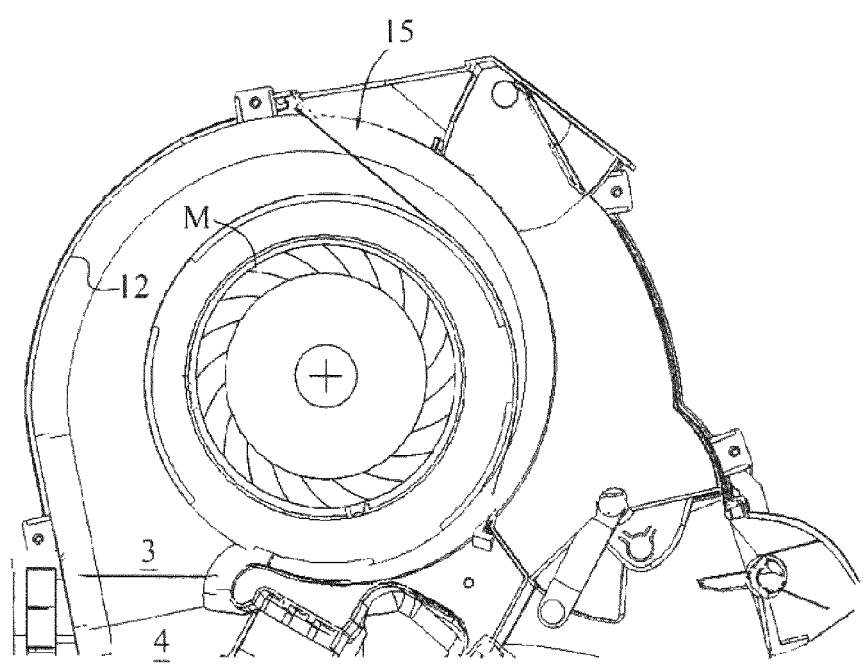
FIG. 2 is a partial cross-section in the plane II-II of FIG. 1 showing a structural detail of the housing.

In order to occupy as limited a space as possible, the housing 1 is of a compact design and groups together the main functions required to provide ventilation to the passenger compartment. Thus, the housing 1 incorporates a suction chamber 2, seen more clearly in FIG. 2, that is intended to receive at least one centrifugal impeller of a motor-fan unit M. The outlet 3 of the suction chamber 2 is connected to a distribution chamber 4, the outlet of which is itself connected to channels 5 for the distribution of pulsed air from the suction chamber 2.

Figure 3:
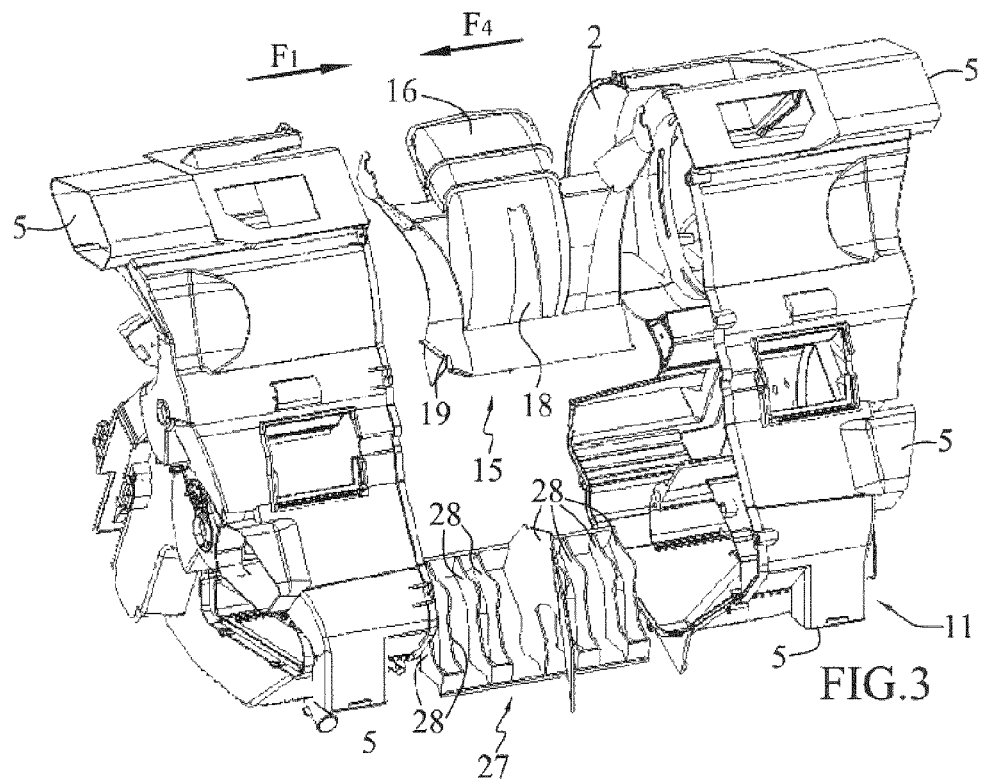
FIG. 3 is an exploded diagrammatic perspective view of the ventilation unit housing illustrated in FIG. 1.

So that the cost of manufacture and fitting is reasonable, the outer envelope of the housing, as seen in FIG. 1, is mainly formed by two casings 10 and 11 assembled along a parting line P substantially perpendicular to the axis of rotation of the impeller inside the suction chamber 2. The assembly of the two casings 10 and 11 is effected in the direction of the arrows F1 in FIG. 3 parallel to the axis of rotation of the impeller inside the suction chamber 2. Each of the casings 10 and 11 is obtained by injection moulding of a plastics material in a mould which opens in the opposite direction to that of the arrows F1. It is therefore difficult, or even impossible, to form inside a casing 10 or 11 one or more walls that are perpendicular to the direction of opening of the mould and are not adjacent to a lateral opening produced by means of a movable core of the mould.

Furthermore, so that the suction produced in the suction chamber 2 is as effective as possible, it is necessary that the peripheral wall of the suction chamber 2 forms a volute 12 of which the walls perpendicular to the axis of rotation of the impeller are as close as possible to said impeller so as to limit leaks. However, insofar as the suction chamber 2 is situated in a median area of the housing 1, it is particularly difficult, or even impossible, to obtain volute walls of satisfactory shape, straight from the mould in the region of the casings 10 and 11.

In order to overcome this difficulty, the invention proposes to use an internal partition element 15 which is added to the interior of the casings 10 and 11, as shown in FIG. 1, in which the internal partition element 15 is visible transparently and shown in dashed lines in contrast to the rest of the housing 1. The position of the internal partition element 15 inside the casings 10 and 11 can also be seen in FIG. 4. The internal partition element 15 thus comprises a concave face, visible in FIG. 5, that forms at least a portion of the volute 12 whereas the rear face, visible in FIG. 6, is instead convex and forms a wall of at least one distribution channel 5.

Figure 5:
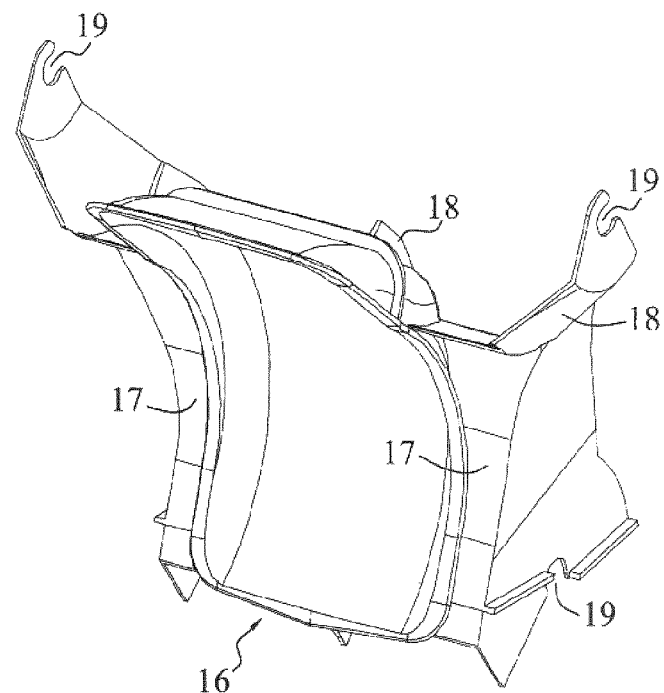
FIGS. 5 and 6 are three-quarters perspective views, front and rear respectively, of an added internal partition element of the housing illustrated in FIGS. 1 to 4.
Figure 6:
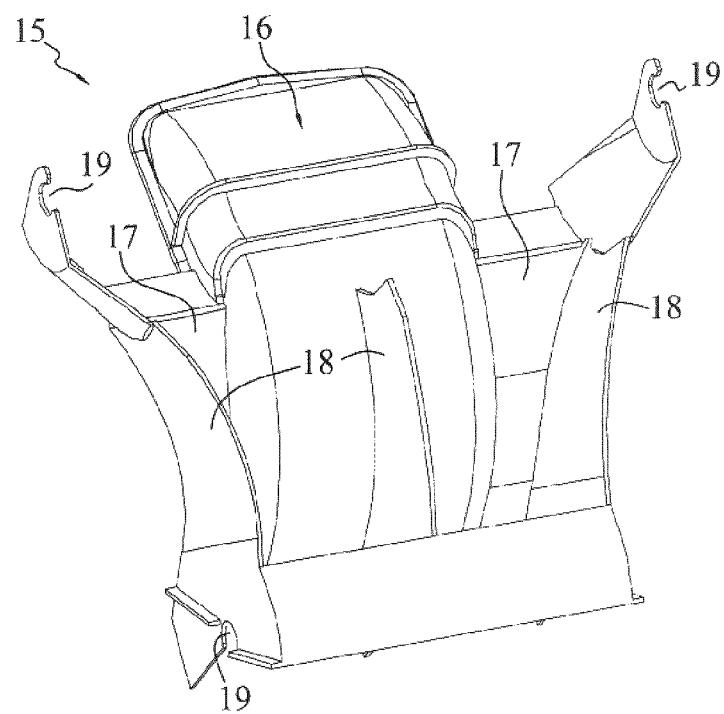

As is shown more particularly in FIGS. 5 and 6, the internal partition element 15 has a central portion 16 that forms a portion of a curved shell intended to partially enclose the impeller situated in the suction chamber 2 to form the point of origin of the volute 12. Seen from the front face, as shown in FIG. 5, this central portion 16 has a doubly concave shape, being curved at the parting line P and being U-shaped in a cross-section perpendicular to the parting line P. Inasmuch as the walls of the internal partition element 15 are relatively thin, the central portion 16 has, when viewed from the rear, as shown in FIG. 6, a doubly convex shape corresponding to the doubly concave shape of the front face.

The central portion 16 of the internal partition element 15 is bordered by two lateral wings 17 which are substantially perpendicular to the parting line P. The lateral wings 17 help to define the walls of the distribution channels 5 inside the housing 1.

Figure 4:
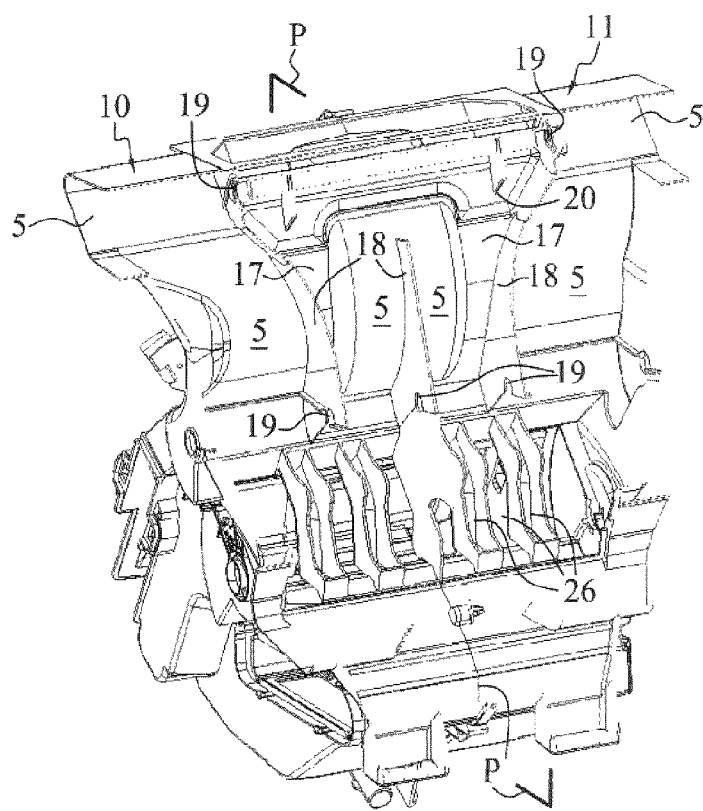
FIG. 4 is a perspective view, with partial cut-away, of the housing illustrated in FIG. 1.

The internal partition element 15 also has, on its face opposite the volute 12, namely its rear face, at least one and, in the example illustrated in FIG. 4, three dividing walls 18 which are substantially parallel to the parting line P. The three dividing walls 18 help to delimit, with the walls of the casings 10 and 11, four adjacent distribution channels 5, as shown in FIG. 4, and serve in particular to separate the flows of air between the outlets for defrosting air and ventilation air. It should be noted that the dividing walls 18 extend substantially perpendicular to the face of the partition element 15 that bears them.

The use of the internal partition element 15 therefore makes it possible to partially fit the volute 12 into the distribution channels 5 so that the total depth of the housing 1 of the ventilation, heating and/or air-conditioning unit can be reduced. Such a configuration could not have been produced without the internal partition element 15 inasmuch as the structures that it defines could not have been obtained directly by moulding the casings 10 and 11.

According to the example illustrated in particular in FIG. 4, the internal partition element 15 also comprises at least one, and in the example illustrated in FIG. 4, five support bearings 19 of control valves 20 of distribution channels 5. The control valves 20 enable said distribution channels 5 to be opened selectively depending on the mode of operation of the ventilation unit and/or on the selections made by the user. In this case, the bearings 19 are each arranged in a dividing wall 18.

In the example shown, the housing 1 also comprises a mixing chamber 25 inside which cool air can be mixed with warm air so as to obtain air at a pre-set temperature. In order to allow rapid homogenisation of the temperature despite the short time spent in the mixing chamber 25, the invention proposes to define, inside a wall of a portion of said mixing chamber 25, a plurality of supply channels thereof.

Accordingly, a second internal partition element 27 is used, which is added to the interior of the casings 10 and 11 and which comprises at least two and, in the example illustrated, nine dividing walls 28 separating supply channels 26. The second internal partition element 27 can be independent of the internal partition element 15 or, on the contrary, form an integral part thereof so that they form one and the same internal partition element.

Of course, various other modifications can be made to the invention within the scope of the appended claims.

The invention claimed is:

1. A housing of a heating, ventilation and/or air-conditioning unit for a motor vehicle passenger compartment, the housing comprising:
   a suction chamber (2) having a peripheral wall forming a volute (12) and is intended to receive an impeller of a motor-fan unit;
   a distribution chamber (4) connected to an outlet (3) of the suction chamber (2); distribution channels (5) connected to an outlet of the distribution chamber (4);
   an internal partition element (15) having a face forming at least a portion of the volute (12) and a rear face opposite the volute forming a wall of at least one distribution channel (5); and
   two casings (10, 11) that together form an outer envelope of the housing with the internal partition element (15) inside and separate from the two casings (10, 11), wherein the two casings (10, 11) delimit at least another portion of the volute (12) of the suction chamber (2) and at least a portion of the distribution channels (5).

2. A housing according to claim 1, wherein the internal partition element (15) bears, on the rear face opposite the volute (12), at least one dividing wall (18) separating two distribution channels (5).

3. A housing according to claim 2, wherein the internal partition element (15) comprises at least three dividing walls (18) separating at least two distribution channels (5).

4. A housing according to claim 3, wherein each dividing wall (18) extends substantially perpendicular from the rear face of the partition element (15).

5. A housing according to claim 2, wherein each dividing wall (18) extends substantially perpendicular from the rear face of the partition element (15).

6. A housing according to claim 5, further comprising at least one mixing chamber (25) with the internal partition element (15) comprises at least two dividing walls (28) separating supply channels of the at least one mixing chamber (25).

7. A housing according to claim 2, further comprising at least one mixing chamber (25) with the internal partition element (15) comprises at least two dividing walls (28) separating supply channels of the at least one mixing chamber (25).

8. A housing according to claim 1, further comprising at least one mixing chamber (25) with the internal partition element (15) comprises at least two dividing walls (28) separating supply channels of the at least one mixing chamber (25).

9. A housing according to claim 1, further comprising at least one mixing chamber (25) and at least a second added internal partition element (27) which comprises at least two dividing walls (28) separating supply channels (26) of the at least one mixing chamber (25).

10. A housing according to claim 1, wherein the internal partition element (15) comprises at least one support bearing (19) of a control valve of at least one distribution channel (5).

11. A housing according to claim 10, wherein the support bearing (19) is arranged in a dividing wall (18, 28).

12. A ventilation, heating and/or air-conditioning unit for a motor vehicle passenger compartment comprising a housing (1) according to claim 1 and a motor-fan unit (M) of which an impeller is situated in the suction chamber (2) of the housing of the ventilation, heating and/or air-conditioning unit.

13. A housing according to claim 1, wherein a central portion (16) of the internal partition element (15) is bordered by two lateral wings (17), each of the two lateral wings perpendicular to a parting line (P), the parting line (P) extending in a direction perpendicular to an axis of rotation of the impeller when the impeller is received inside the suction chamber (2).

14. A housing of a heating, ventilation and/or air-conditioning unit for a motor vehicle passenger compartment, the housing comprising:
   a suction chamber (2) having a peripheral wall forming a volute (12) and is intended to receive an impeller of a motor-fan unit;
   a distribution chamber (4) connected to an outlet (3) of the suction chamber (2);
   distribution channels (5) connected to an outlet of the distribution chamber (4); and
   an internal partition element (15) having a face forming at least a portion of the volute (12) and a rear face opposite the volute forming a wall of at least one distribution channel (5);
   wherein a central portion (16) of the internal partition element (15) is bordered by two lateral wings (17), each extending on opposite side of a parting line (P) and terminating at a dividing wall (18), the dividing wall (18) extending in a direction perpendicular to the respective lateral wing (17), and with the parting line (P) extending in a direction perpendicular to an axis of rotation of the impeller when the impeller is received inside the suction chamber (2).

* * * * *